(12) United States Patent
Patten et al.

(10) Patent No.: US 8,875,371 B2
(45) Date of Patent: Nov. 4, 2014

(54) ARTICULATED CONDUIT LINKAGE SYSTEM

(75) Inventors: James W. Patten, Sandy, UT (US);
Todd Dana, Park City, UT (US)

(73) Assignee: Red Leaf Resources, Inc., Sandy, UT (US)

( * ) Notice: Subject to any disclaimer, the term of this patent is extended or adjusted under 35 U.S.C. 154(b) by 1304 days.

(21) Appl. No.: 12/704,440

(22) Filed: Feb. 11, 2010

(65) Prior Publication Data

US 2010/0206410 A1 Aug. 19, 2010

Related U.S. Application Data

(60) Provisional application No. 61/152,180, filed on Feb. 12, 2009.

(51) Int. Cl.
| | | |
|---|---|---|
| *C10G 1/04* | (2006.01) | |
| *B23P 11/00* | (2006.01) | |
| *F16L 27/08* | (2006.01) | |
| *C10G 1/02* | (2006.01) | |
| *C10G 9/36* | (2006.01) | |
| *C10G 9/38* | (2006.01) | |

(52) U.S. Cl.
CPC .............. *F16L 27/082* (2013.01); *C10G 1/02* (2013.01); *C10G 9/36* (2013.01); *C10G 9/38* (2013.01); *F16L 27/0816* (2013.01); *F16L 27/0861* (2013.01); *C10G 2300/4037* (2013.01)
USPC ............ 29/434; 52/169.7; 299/2; 299/3; 299/6; 405/128.35; 405/128.55; 405/128.6; 405/128.65; 405/128.8; 405/128.85; 405/128.9; 405/129.27; 405/129.28; 405/129.57; 405/129.7

(58) Field of Classification Search
USPC ............ 29/434, 436; 299/2, 3, 6; 405/128.35, 405/128.4, 128.55, 128.6, 128.65, 128.8, 405/128.85, 128.9, 129.27, 129.28, 129.57, 405/129.7; 52/169.7, 169.8
See application file for complete search history.

(56) References Cited

U.S. PATENT DOCUMENTS

| | | |
|---|---|---|
| 1,919,636 A | 7/1933 | Karrick |
| 2,481,051 A | 9/1949 | Uren |

(Continued)

FOREIGN PATENT DOCUMENTS

| | | |
|---|---|---|
| CN | 2010/013277 | 1/2008 |
| WO | WO 2008/098177 | 8/2008 |

OTHER PUBLICATIONS

US PCT Application PCT/US2010/023927; filed Feb. 11, 2010; James W. Patten; ISR mailed Sep. 27, 2010.

(Continued)

*Primary Examiner* — Essama Omgba
(74) *Attorney, Agent, or Firm* — Thorpe North & Western LLP

(57) ABSTRACT

An articulating conduit linkage system for maintaining a fluid connection between a fluid source and displaceable conduit that has been buried in a subsiding permeable body. A fluid source can supply a working fluid through a source outlet. A displaceable conduit can receive the working fluid through a conduit inlet, and be buried at a depth within a subsiding permeable body that is contained within a permeability control infrastructure. A plurality of articulating conduit segments can include, an outer conduit segment coupled to the source outlet, an inner conduit segment coupled to the conduit inlet, and at least one middle conduit segment coupled to the outer and inner segments. In the event of a subsidence, the plurality of articulating conduit segments are configured so the outer and inner conduit segments extend the conduit linkage system while maintaining a working fluid connection between the source outlet and the conduit inlet.

20 Claims, 5 Drawing Sheets

(56) References Cited

U.S. PATENT DOCUMENTS

| | | | |
|---|---|---|---|
| 2,648,201 A * | 8/1953 | Marancik et al. | 141/59 |
| 3,372,715 A * | 3/1968 | Ashton | 141/59 |
| 3,651,832 A * | 3/1972 | Meyer | 137/615 |
| 3,661,423 A | 5/1972 | Garrett | |
| 3,700,833 A * | 10/1972 | Behme | 191/12 R |
| 3,837,380 A * | 9/1974 | Davies | 141/279 |
| 3,954,140 A | 5/1976 | Hendrick | |
| 4,017,119 A | 4/1977 | Lewis | |
| 4,096,912 A | 6/1978 | Lewis et al. | |
| 4,099,542 A * | 7/1978 | Gibbons | 137/615 |
| 4,106,814 A | 8/1978 | French | |
| 4,133,580 A | 1/1979 | French | |
| 4,176,864 A | 12/1979 | Pohl | |
| 4,202,372 A * | 5/1980 | Gibbons | 137/615 |
| 4,207,920 A | 6/1980 | Westerhoff | |
| 4,219,237 A | 8/1980 | Sisemore | |
| 4,220,177 A * | 9/1980 | Gill | 137/615 |
| 4,234,216 A * | 11/1980 | Swanson et al. | 285/93 |
| 4,234,230 A | 11/1980 | Weichman | |
| 4,241,952 A | 12/1980 | Ginsburgh | |
| 4,266,612 A | 5/1981 | French | |
| 4,266,826 A | 5/1981 | French | |
| 4,294,563 A | 10/1981 | Kilburn | |
| 4,415,365 A | 11/1983 | Spars et al. | |
| 4,423,907 A | 1/1984 | Ridley | |
| 4,424,021 A | 1/1984 | Merrill, Jr. | |
| 4,430,195 A | 2/1984 | Oltrogge | |
| 4,440,446 A | 4/1984 | Hutchins | |
| 4,452,689 A | 6/1984 | Russum | |
| 4,454,915 A | 6/1984 | York et al. | |
| 4,502,920 A | 3/1985 | Edwards | |
| 4,984,594 A | 1/1991 | Vinegar et al. | |
| 4,993,463 A * | 2/1991 | von Meyerinck et al. | 141/387 |
| 5,024,487 A | 6/1991 | Woestemeyer et al. | |
| 5,076,727 A | 12/1991 | Johnson et al. | |
| 5,114,497 A | 5/1992 | Johnson et al. | |
| 5,160,173 A | 11/1992 | Le Devehat | |
| 5,190,405 A | 3/1993 | Vinegar et al. | |
| 5,193,934 A | 3/1993 | Johnson et al. | |
| 5,221,827 A | 6/1993 | Marsden et al. | |
| 5,229,583 A | 7/1993 | van Egmond et al. | |
| 5,244,310 A | 9/1993 | Johnson | |
| 5,271,693 A | 12/1993 | Johnson et al. | |
| 5,318,116 A | 6/1994 | Vinegar et al. | |
| 5,340,467 A | 8/1994 | Gregoli et al. | |
| 5,372,708 A | 12/1994 | Gewertz | |
| 5,553,189 A | 9/1996 | Stegemeier et al. | |
| 5,656,239 A | 8/1997 | Stegemeier et al. | |
| 5,660,500 A | 8/1997 | Marsden, Jr. et al. | |
| 5,674,424 A | 10/1997 | Iben et al. | |
| 5,868,202 A | 2/1999 | Hsu | |
| 5,997,214 A | 12/1999 | de Rouffignac et al. | |
| 6,102,622 A | 8/2000 | Vinegar et al. | |
| 6,110,359 A | 8/2000 | Davis et al. | |
| 6,419,423 B1 | 7/2002 | Vinegar et al. | |
| 6,485,232 B1 | 11/2002 | Vinegar et al. | |
| 6,543,535 B2 | 4/2003 | Converse et al. | |
| 6,543,539 B1 | 4/2003 | Vinegar et al. | |
| 6,632,047 B2 | 10/2003 | Vinegar et al. | |
| 6,732,796 B2 | 5/2004 | Vinegar et al. | |
| 6,811,683 B2 | 11/2004 | Davis et al. | |
| 6,824,328 B1 | 11/2004 | Vinegar et al. | |
| 6,854,929 B2 | 2/2005 | Vinegar et al. | |
| 6,875,356 B2 | 4/2005 | Perriello | |
| 6,881,009 B2 | 4/2005 | Stegemeier et al. | |
| 6,902,138 B2 | 6/2005 | Vantouroux | |
| 6,918,443 B2 | 7/2005 | Wellington et al. | |
| 6,923,257 B2 | 8/2005 | Wellington et al. | |
| 6,929,330 B2 | 8/2005 | Drake et al. | |
| 6,951,247 B2 | 10/2005 | de Rouffignac et al. | |
| 6,962,466 B2 | 11/2005 | Vinegar et al. | |
| 6,991,033 B2 | 1/2006 | Wellington et al. | |
| 7,004,247 B2 | 2/2006 | Cole et al. | |
| 7,004,251 B2 | 2/2006 | Ward et al. | |
| 7,004,678 B2 | 2/2006 | Stegemeier et al. | |
| 7,032,660 B2 | 4/2006 | Vinegar et al. | |
| 7,040,397 B2 | 5/2006 | de Rouffignac et al. | |
| 7,040,399 B2 | 5/2006 | Wellington et al. | |
| 7,048,051 B2 | 5/2006 | McQueen | |
| 7,051,811 B2 | 5/2006 | de Rouffignac et al. | |
| 7,066,254 B2 | 6/2006 | Vinegar et al. | |
| 7,070,758 B2 | 7/2006 | Peterson | |
| 7,073,578 B2 | 7/2006 | Vinegar et al. | |
| 7,077,198 B2 | 7/2006 | Vinegar et al. | |
| 7,077,199 B2 | 7/2006 | Vinegar et al. | |
| 7,090,013 B2 | 8/2006 | Wellington | |
| 7,091,460 B2 | 8/2006 | Kinzer | |
| 7,114,566 B2 | 10/2006 | Vinegar et al. | |
| 7,121,342 B2 | 10/2006 | Vinegar et al. | |
| 7,219,740 B2 * | 5/2007 | Saucier | 166/366 |
| 7,296,629 B2 * | 11/2007 | Bartlett | 166/348 |
| 7,534,926 B2 | 5/2009 | Stegemeier et al. | |
| 7,565,931 B2 * | 7/2009 | Saucier | 166/344 |
| 7,862,705 B2 * | 1/2011 | Dana et al. | 208/106 |
| 7,862,706 B2 * | 1/2011 | Dana et al. | 208/106 |
| 7,906,014 B2 * | 3/2011 | Dana et al. | 208/106 |
| 7,967,974 B2 * | 6/2011 | Dana et al. | 208/106 |
| 8,109,047 B2 * | 2/2012 | Dana et al. | 52/169.7 |
| 8,349,171 B2 * | 1/2013 | Dana et al. | 208/400 |
| 8,366,917 B2 * | 2/2013 | Dana et al. | 208/311 |
| 2003/0147697 A1 * | 8/2003 | Brady et al. | 405/128.15 |
| 2004/0211569 A1 | 10/2004 | Vinegar et al. | |
| 2005/0098321 A1 * | 5/2005 | Bartlett | 166/348 |
| 2006/0213657 A1 | 9/2006 | Berchenko et al. | |
| 2007/0000662 A1 | 1/2007 | Symington et al. | |
| 2007/0023186 A1 | 2/2007 | Kaminsky et al. | |
| 2007/0084514 A1 * | 4/2007 | Perratone et al. | 137/615 |
| 2008/0190813 A1 | 8/2008 | Dana | |
| 2008/0190815 A1 | 8/2008 | Dana | |
| 2008/0190816 A1 | 8/2008 | Dana | |
| 2008/0190818 A1 | 8/2008 | Dana | |
| 2009/0250380 A1 | 10/2009 | Dana | |
| 2010/0200466 A1 * | 8/2010 | Dana et al. | 208/390 |
| 2010/0200467 A1 * | 8/2010 | Dana et al. | 208/390 |
| 2011/0094952 A1 * | 4/2011 | Dana et al. | 210/185 |
| 2011/0308801 A1 * | 12/2011 | Dana | 166/302 |
| 2011/0313218 A1 * | 12/2011 | Dana | 585/240 |
| 2012/0138422 A1 * | 6/2012 | Dana | 196/46 |
| 2012/0138445 A1 * | 6/2012 | Dana | 201/18 |
| 2012/0138446 A1 * | 6/2012 | Dana | 202/108 |
| 2012/0141947 A1 * | 6/2012 | Dana | 432/5 |

OTHER PUBLICATIONS

Alternative Methods for Fluid Delivery and Recovery; Manual; Sep. 1994; United States Environmental Protection Agency; 87 pgs.
U.S. Appl. No. 12/703,638, filed Feb. 10, 2010, Todd Dana.
U.S. Appl. No. 12/702,899, filed Feb. 9, 2010, Todd Dana.
U.S. Appl. No. 12/703,560, filed Feb. 10, 2010, Todd Dana.
U.S. Appl. No. 12/704,596, filed Feb. 12, 2010, Todd Dana.
U.S. Appl. No. 12/701,073, filed Feb. 5, 2010, Todd Dana.
U.S. Appl. No. 12/701,141, filed Feb. 5, 2010, Todd Dana.
U.S. Appl. No. 12/701,156, filed Feb. 5, 2010, Todd Dana.

* cited by examiner

ARTICULATED CONDUIT LINKAGE SYSTEM

RELATED APPLICATIONS

This application claims the benefit of U.S. Provisional Application No. 61/152,180, filed Feb. 12, 2009, and entitled "Articulated Conduit Linkage System," which application is incorporated by reference in its entirety herein.

BACKGROUND

Global and domestic demand for fossil fuels continues to rise despite price increases and other economic and geopolitical concerns. As such demand continues to rise, research and investigation into finding additional economically viable sources of fossil fuels correspondingly increases. Historically, many have recognized the vast quantities of energy stored in oil shale, coal and tar sand deposits, for example. However, these sources remain a difficult challenge in terms of economically competitive recovery. Canadian tar sands have shown that such efforts can be fruitful, although many challenges still remain, including environmental impact, product quality, production costs and process time, among others.

Estimates of world-wide oil shale reserves range from two to almost seven trillion barrels of oil, depending on the estimating source. Regardless, these reserves represent a tremendous volume and remain a substantially untapped resource. A large number of companies and investigators continue to study and test methods of recovering oil from such reserves. In the oil shale industry, methods of extraction have included underground rubble chimneys created by explosions, in-situ methods such as In-Situ Conversion Process (ICP) method (Shell Oil), and heating within steel fabricated retorts. Other methods have included in-situ radio frequency methods (microwaves), and "modified" in-situ processes wherein underground mining, blasting and retorting have been combined to make rubble out of a formation to allow for better heat transfer and product removal Among typical oil shale processes, all face tradeoffs in economics and environmental concerns. No current process alone satisfies economic, environmental and technical challenges. Moreover, global warming concerns give rise to additional measures to address carbon dioxide ($CO_2$) emissions which are associated with such processes. Methods are needed that accomplish environmental stewardship, yet still provide a high-volume cost-effective oil production.

Below ground in-situ concepts emerged based on their ability to produce high volumes while avoiding the cost of mining. While the cost savings resulting from avoiding mining can be achieved, the in-situ method requires heating a formation for a longer period of time due to the extremely low thermal conductivity and high specific heat of solid oil shale. Perhaps the most significant challenge for any in-situ process is the uncertainty and long term potential of water contamination that can occur with underground freshwater aquifers. In the case of Shell's ICP method, a "freeze wall" is used as a barrier to keep separation between aquifers and an underground treatment area. Although this is possible, no long term analysis has proven for extended periods to guarantee the prevention of contamination. Without guarantees and with even fewer remedies should a freeze wall fail, other methods are desirable to address such environmental risks.

For this and other reasons, the need remains for methods and systems which can provide improved recovery of hydrocarbons from suitable hydrocarbon-containing materials, which have acceptable economics and avoid the drawbacks mentioned above.

SUMMARY

Disclosed and described is an articulating conduit linkage system for maintaining a fluid connection between a fluid source and displaceable conduit that has been buried in a subsiding permeable body of hydrocarbonaceous material. The system includes a fluid source for supplying a working fluid through a source outlet, and which is located outside of the boundaries of a constructed permeability control infrastructure. The system also includes a displaceable conduit that receives the working fluid through a conduit inlet, and which is being buried at a depth within the subsiding permeable body of hydrocarbonaceous material that is contained within the control infrastructure. The linkage system further includes a plurality of articulating conduit segments which comprise: an outer conduit segment that is operably coupled to the source outlet with a first single-axis swivel joint, an inner conduit segment that is operably coupled to the conduit inlet with a second single-axis swivel joint, and at least one middle conduit segment that operably connects the outer and inner segments, respectively, with at least one single-axis swivel joint to establish a working fluid connection between the fluid source and the displaceable conduit. In the event of a subsidence of the permeable body which causes a relative displacement between the source outlet and the conduit inlet that is perpendicular to the longitudinal axes of both the outlet and the inlet, the plurality of articulating conduit segments are configured so the outer and inner conduit segments rotate in opposite directions to extend the conduit linkage system while maintaining the working fluid connection between the source outlet and the conduit inlet.

A method of operably coupling a fluid source and displaceable conduit that has been buried in a subsiding permeable body of hydrocarbonaceous material contained within a constructed permeability control infrastructure can include providing a fluid source for supplying a working fluid through a source outlet. The source outlet can be located outside of the boundaries of the constructed permeability control infrastructure. The method also includes providing a displaceable conduit for receiving the working fluid through a conduit inlet, and which is buried at a depth within a subsiding permeable body of hydrocarbonaceous material contained within the control infrastructure. The method further includes establishing a fluid connection between the heat source and the heating conduit with a plurality of articulating conduit segments that comprise: an outer conduit segment operably coupled to the source outlet with a first single-axis swivel joint, an inner conduit segment operably coupled to the conduit inlet with a second single-axis swivel joint, and at least one middle conduit segment operably connecting the outer and inner segments, respectively, with at least one single-axis swivel joint, to establish a working fluid connection between the fluid source and the displaceable conduit. In the event of a subsidence of the permeable body which causes a relative displacement between the source outlet and the conduit inlet that is perpendicular to the longitudinal axes of both the outlet and the inlet, the plurality of articulating conduit segments are configured so that the outer and inner conduit segments to rotate in opposite directions to extend the conduit linkage system while maintaining the working fluid connection between the source outlet and the conduit inlet.

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments and are not, therefore, to be considered limiting of its scope. And furthermore, it will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings, in which.

DETAILED DESCRIPTION OF EXEMPLARY EMBODIMENTS

Figure 1:
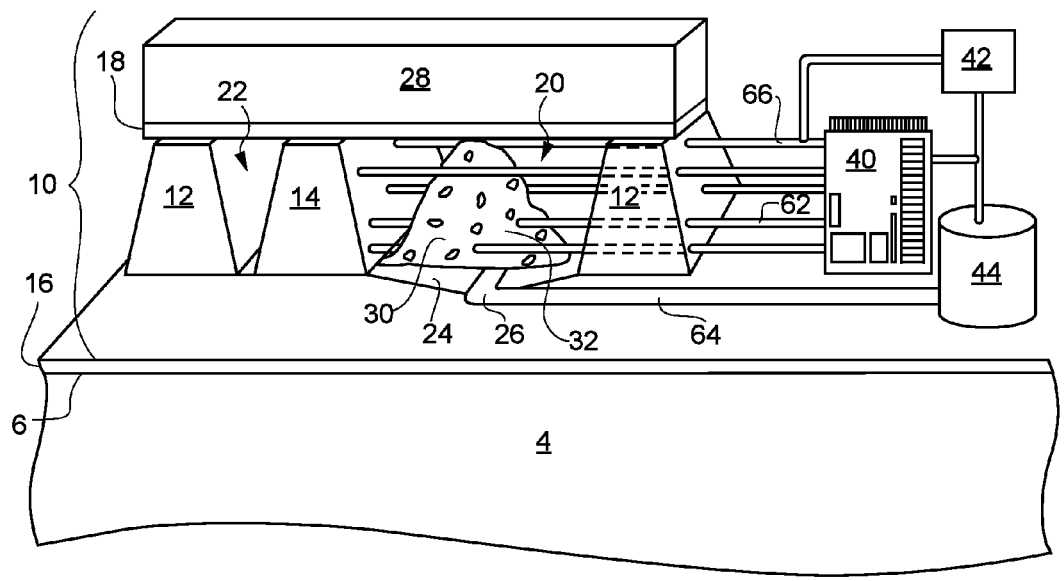
FIG. 1 illustrates a partial cutaway, side schematic view of a constructed permeability control infrastructure that includes a permeable body of hydrocarbonaceous material, a heat source, and interconnecting piping, in accordance with one embodiment.

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

DEFINITIONS

In describing and claiming the present invention, the following terminology will be used.

The singular forms "a," "an," and "the" include plural references unless the context clearly dictates otherwise. Thus, for example, reference to "a wall" includes reference to one or more of such structures, "a permeable body" includes reference to one or more of such materials, and "a heating step" refers to one or more of such steps.

As used herein, "conduits" refers to any passageway along a specified distance which can be used to transport materials and/or heat from one point to another point. Although conduits can generally be circular pipes, other non-circular conduits can also be useful. Conduits can advantageously be used to either introduce fluids into or extract fluids from the permeable body, convey heat transfer, and/or to transport radio frequency devices, fuel cell mechanisms, resistance heaters, or other devices.

As used herein, "longitudinal axis" refers to the long axis or centerline of a conduit or passage.

As used herein, "transverse" refers to a direction that cuts across a referenced plane or axis at an angle ranging from perpendicular to about 45 degrees off the referenced plane or axis.

As used herein, "conformably bend" refers to bending which at least partially follows subsidence movement of the permeable body during heating. Such bending allows for lateral deflection of the conduit while reducing the risk of rupturing the walls of the conduit.

As used herein, "longitudinal axis thermal expansion" refers to an accordion-like effect along the length of the corrugated conduit. When corrugations are circumferential, e.g. spiral or circular, as the conduit material expands the corrugations allow the overall length of the conduit to increase if the conduit is free to move at one or both ends. If the conduit is fixed along its length, however, the corrugations allow the longitudinal expansion to be absorbed at the individual corrugations. Thus, a corrugated conduit can be designed to eliminate linear expansion or at least reduce the stresses associated with restrained linear expansion by allowing corrugations to permit flexing without loss of conduit wall integrity.

As used herein, "apertures" refers to holes, slots, pores or openings, etc., in the walls or joints of the conduit which allow the flow of fluid, whether gases or liquids, between the interior of conduit and the immediately adjacent environment. The flow can be outwards towards the adjacent environment if the pressure inside the conduit is greater than the outside pressure. The flow can also be inwards toward the interior of the conduit if the pressure inside the conduit is less than the outside pressure.

As used herein, "constructed infrastructure" refers to a structure which is substantially entirely man made, as opposed to freeze walls, sulfur walls, or other barriers which are formed by modification or filling pores of an existing geological formation.

The constructed permeability control infrastructure is often substantially free of undisturbed geological formations, although the infrastructure can be formed adjacent or in direct contact with an undisturbed formation. Such a control infrastructure can be unattached or affixed to an undisturbed formation by mechanical means, chemical means or a combination of such means, e.g. bolted into the formation using anchors, ties, or other suitable hardware.

As used herein, "comminuted" refers to breaking a formation or larger mass into pieces. A comminuted mass can be rubbilized or otherwise broken into fragments.

As used herein, "hydrocarbonaceous material" refers to any hydrocarbon-containing material from which hydrocarbon products can be extracted or derived. For example, hydrocarbons may be extracted directly as a liquid, removed via solvent extraction, directly vaporized or otherwise removed from the material. However, many hydrocarbonaceous materials contain kerogen or bitumen which is converted to a hydrocarbon through heating and pyrolysis. Hydro carbonaceous materials can include, but is not limited to, oil shale, tar sands, coal, lignite, bitumen, peat, and other organic materials.

As used herein, "impoundment" refers to a structure designed to hold or retain an accumulation of fluid and/or solid moveable materials. An impoundment generally derives at least a substantial portion of foundation and structural support from earthen materials. Thus, the control walls do not always have independent strength or structural integrity apart from the earthen material and/or formation against which they are formed.

As used herein, "permeable body" refers to any mass of comminuted hydro carbonaceous material having a relatively high permeability which exceeds permeability of a solid undisturbed formation of the same composition. Suitable permeable bodies can have greater than about 10% void space and typically have void space from about 30% to 45%, although other ranges may be suitable. Allowing for high permeability facilitates, for example, through the incorporation of large irregularly shaped particles, heating of the body through convection as the primary heat transfer while also substantially reducing costs associated with crushing to very small sizes, e.g. below about 1 to about 0.5 inch.

As used herein, "wall" refers to any constructed feature having a permeability control contribution to confining material within an encapsulated volume defined at least in part by control walls. Walls can be oriented in any manner such as vertical, although ceilings, floors and other contours defining the encapsulated volume can also be "walls" as used herein.

As used herein, "mined" refers to a material which has been removed or disturbed from an original stratographic or geological location to a second and different location or returned to the same location. Typically, mined material can be produced by rubbilizing, crushing, explosively detonating, or otherwise removing material from a geologic formation.

As used herein, "bulk convective flow pattern" refers to convective heat flow which spans a majority of the permeable body. Generally, convective flow is generated by orienting one or more conduits or heat sources in a lower or base portion of a defined volume. By orienting the conduits in this manner, heated fluids can flow upwards and cooled fluids flow back down along a substantial majority of the volume occupied by the permeable body of hydrocarbonaceous material in a recirculating pattern.

As used herein, "substantially stationary" refers to nearly stationary positioning of materials with a degree of allowance for subsidence, expansion, and/or settling as hydrocarbons are removed from the hydrocarbonaceous material from within the enclosed volume to leave behind lean material. In contrast, any circulation and/or flow of hydrocarbonaceous material such as that found in fluidized beds or rotating retorts involves highly substantial movement and handling of hydrocarbonaceous material.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and 200, but also to include individual sizes such as 2, 3, 4, and sub-ranges such as 10 to 50, to 100, etc.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Articulated Conduit Linkage System

Illustrated in FIGS. 1-6 are several representative embodiments of an articulated conduit linkage system which can be used to maintain a fluid connection between a source of heat transfer fluid and a displaceable heating conduit buried within a subsiding permeable body. The permeable body can be a hydrocarbonaceous material, although other subsiding materials can be used. The hydrocarbonaceous material can include mined materials such as oil shale, tar sands, coal, etc., that are placed within a suitable structure (e.g. a constructed permeability control infrastructure, an impoundment, or other structure) with the intent to extract or otherwise liberate hydrocarbon products therefrom. The hydrocarbons can be liberated by passing a heat transfer fluid, such as hot air, hot exhaust gases, steam, hydrocarbon vapors and/or hot liquids, into or through the buried heating conduit to heat the hydrocarbonaceous material to temperature levels sufficient to remove hydrocarbons therefrom.

Exemplary embodiments of one alternative constructed permeability control infrastructure, and the permeable body of hydrocarbonaceous material contained within its substantially encapsulated volume, are described in more detail in commonly-owned and co-pending U.S. patent application Ser. No. 12/028,569, filed Feb. 8, 2008, and entitled "Methods Of Recovering Hydrocarbons From Hydrocarbonaceous Material Using A Constructed Infrastructure And Associated Systems," which application is incorporated by reference in its entirety herein. However, other structures can also be used which provide at least some control or containment of materials within the structure. For example, the articulated conduit linkage system can also be suitable for use whenever conduits are embedded in a material which subsides over time. Subsidence can be the result of removal of hydrocarbons, deterioration of the permeable body, or other processes.

In order for the extraction process to be effective, it may be desirable to raise the temperature of the permeable body to between 200 degrees and 900 degrees Fahrenheit to initiate pyrolysis. It has been discovered that during the heating process the permeable body of hydrocarbonaceous material can remain substantially stationary in the lateral directions, but over time can undergo significant vertical subsidence and settling as the hydrocarbons are released to flow downwards as a liquid or upwards as a gas. Subsidence of the permeable body can cause the embedded heating conduit to displace downwardly as well. Small relative displacements between adjacent conduit segments that are both subsiding can be accommodated by providing the heating conduit with flexible joints, seams or corrugations which can absorb localized bending. However, large displacements between adjacent conduit segments, where one segment is subsiding and the other is fixed, may create sheer stresses that cannot be accommodated or absorbed simply by providing flexible joints, seams or corrugations.

Such a situation can exist between the outlet piping of the heat source that provides heat transfer fluid to the permeable body (which outlet is fixed in space) and the inlet to the heating conduit (which inlet can displace downwards with the rest of the displaceable heating conduit). If the relative motion between the source outlet and conduit inlet is great enough, the resulting transverse sheer stresses can exceed the material limits of the conduit walls and joints and result in a rupture that allows the heating fluid to escape. It is desirable, therefore, to maintain the structural integrity and working fluid connection between the source outlet and conduit inlet, regardless of the amount of vertical displacement brought on by subsidence, so that the conduit system can maintain its structural integrity and continue to function throughout the process.

FIG. 1 provides a partial cutaway, side schematic view of a constructed permeability control infrastructure or impoundment 10, a permeable body 30 of hydrocarbonaceous material 32, a heat source 40, and interconnecting piping 62, 64, 66 and 68. In the embodiment shown, the existing grade 4 is used primarily as support for an impermeable floor layer 16. Exterior capsule impoundment side walls 12 can provide containment and can, but need not be, subdivided by interior walls 14. Subdividing can create separate containment capsules 22 within a greater capsule containment 20 of the impoundment 10 which can be any geometry, size or subdivision.

The sidewalls 12 and 14, as well as the impermeable cap 18 and impermeable floor 16 layers, can comprise the permeability control impoundment 10 that defines the encapsulated volume 20, and can be formed of any suitable material. For instance, the sidewalls 12 and 14 of the impoundment 10 can also be self-supporting, wherein the tailings berms, walls, and floors can be compacted and engineered for structure as well as substantial impermeability (e.g. sufficient to prevent uncontrolled escape of fluids from the impoundment). Furthermore, the impermeable cap layer 18 can be used to prevent uncontrolled escape of volatiles and gases, and to direct the gases and vapors to appropriate gas collection outlets 66. Similarly, an impermeable floor layer 16 can be used to contain and direct collected liquids to a suitable outlet such the drain system 26 to remove liquid products from lower regions of the impoundment. Although impermeable side walls can be desirable in some embodiments, such are not always required. Having permeable side walls may allow some small egress of gases and/or liquids from the impoundment.

Once side wall structures 12 and 14 have been constructed above a constructed and impermeable floor layer 16, which commences from ground surface 6, the mined hydrocarbonaceous material 32 (which may be crushed or classified according to size or hydrocarbon richness), can be placed in layers upon (or next to) placed tubular heating pipes or conduit 62, fluid drainage pipes 64 and/or gas gathering or injection pipes 66. These pipes can be oriented and designed in any optimal flow pattern, angle, length, size, volume, intersection, grid, wall sizing, alloy construction, perforation design, injection rate, and extraction rate. In some cases, pipes such as those used for heat transfer can be connected to, recycled through or derive heat from a heat source 40. Alternatively, or in combination with, recovered gases can be condensed by a condenser 42. Heat recovered by the condenser can be optionally used to supplement heating of the permeable body or for other process needs.

Heat source 40 can derive or create heat from any suitable heat source including, but not limited to, fuel cells (e.g. solid oxide fuel cells, molten carbonate fuel cells and the like), solar sources, wind sources, hydrocarbon liquid or gas combustion heaters, geothermal heat sources, nuclear power plant, coal fired power plant, radio frequency generated heat, wave energy, flameless combustors, natural distributed combustors, or any combination thereof. In some cases, electrical resistive heaters or other heaters can be used, although fuel cells and combustion-based heaters are very effective. In some locations, geothermal water can be circulated to the surface and directed into the infrastructure in adequate amounts to heat the permeable body.

In one embodiment, heating of the permeable body 30 can be accomplished by convective heating from hydrocarbon combustion. Of particular interest is hydrocarbon combustion performed under stoichiometric conditions of fuel to oxygen. Stoichiometric conditions can allow for significantly increased heat gas temperatures. Stoichiometric combustion can employ but does not generally require a pure oxygen source which can be provided by known technologies including, but not limited to, oxygen concentrators, membranes, electrolysis, and the like. In some embodiments oxygen can be provided from air with stoichiometric amounts of oxygen and hydrogen. Combustion off gas can be directed to an ultra-high temperature heat exchanger, e.g. a ceramic or other suitable material having an operating temperature above about 2500° F. Air obtained from ambient or recycled from other processes can be heated via the ultra high temperature heat exchanger and then sent to the impoundment for heating of the permeable body. The combustion off gases can then be sequestered without the need for further separation, i.e. because the off gas is predominantly carbon dioxide and water.

A liquid or gas heat transfer fluid can transfer heat from the heat source 40, through heating conduit 62 and into the permeable body 30 of hydrocarbonaceous material 32. In order to raise the temperature of the permeable body to between 200 degrees and 900 degrees Fahrenheit to initiate pyrolysis, as stated above, the temperature of the heat transfer fluid within the heating conduit can be elevated to even higher temperatures, such as 1000 degrees Fahrenheit or above, to maintain a constant flow of heat from the heat transfer fluid into the permeable body.

The liquids or gases extracted from capsule impoundment treatment area 20 or 22 can be stored in a nearby holding tank 44 or within a capsule containment 20 or 22. For example, the impermeable floor layer 16 can include a sloped area 24 which directs liquids towards drain system 26, from which liquids are directed to the holding tank 44 through drain piping 64.

As placed hydrocarbonaceous rubble material 32 fills the capsule treatment area 20 or 22, permeable body 30 becomes the ceiling support for engineered impermeable cap layer 18, which may include an engineered fluid and gas barrier. Above cap layer 18, fill material 28 can be added to form a top layer that can create lithostatic pressure upon the capsule treatment areas 20 or 22. Covering the permeable body 30 with a compacted fill layer 28 sufficient to create an increased lithostatic pressure within the permeable body 30 can be useful in further increasing hydrocarbon product quality. The compacted fill layer 28 can substantially cover the permeable body 30, while the permeable body 30 in return can substantially support the compacted fill layer 28.

Figure 2:
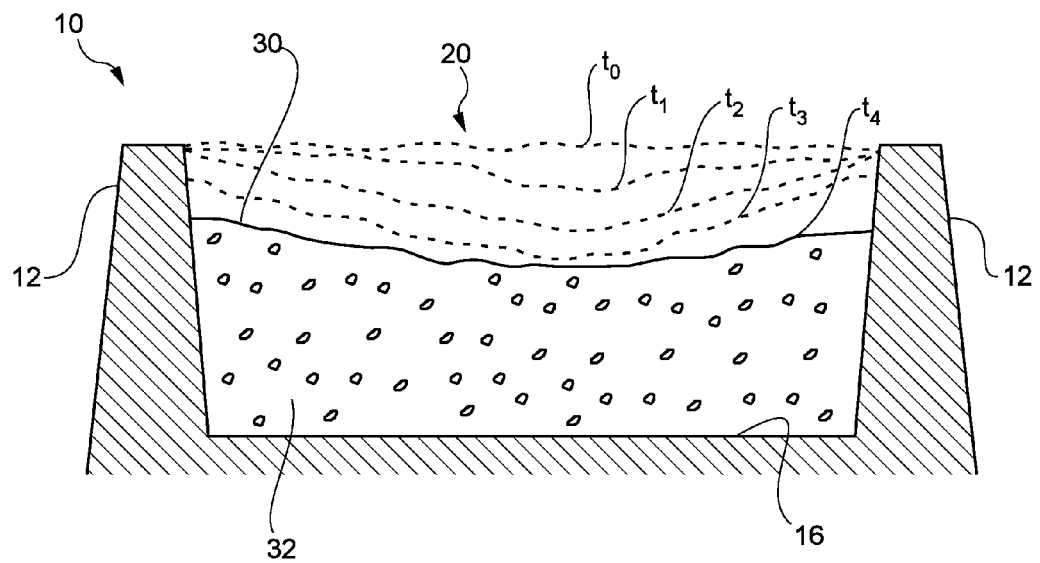
FIG. 2 illustrates a side sectional view of a subsiding permeable body of hydro carbonaceous material contained within a constructed permeability control infrastructure, in accordance with one embodiment.

FIG. 2 is an illustration of the permeable body 30 of hydrocarbonaceous material 32 contained within the constructed permeability control infrastructure or impoundment 10. The permeable body can substantially fill the containment capsule or volume 20 defined by the side walls 12, the impermeable floor layer 16 and the impermeable cap layer (not shown). For instance, during the filling stage and prior to commencement of the heating process, the encapsulated volume 20 can be substantially filled with hydrocarbonaceous material 32 so that top surface $t_0$ of the permeable body 30 is substantially level with the top of the side walls 12 to maximize the amount of hydrocarbonaceous material included in the batch process.

As stated above, it has been discovered that during the heating process that the permeable body of hydrocarbonaceous material can undergo significant vertical subsidence movement and settling as the hydrocarbons are released. This process is a result of the temperature gradients that can begin to develop with the introduction of heat into the permeable body, with the center and upper regions becoming hotter than the side and bottom edges adjacent the unheated boundaries of the containment capsule 20. Naturally, hydrocarbons can begin to flow more readily from the hotter regions, resulting in the initial subsidence having the greatest movement in the center region of the top surface, to the $t_1$ position.

The period of time necessary to reach the $t_1$ position can fluctuate significantly, depending on the composition and configuration of the hydrocarbonaceous material 32, the size of the permeable body 30, the method of heating and heat rate provided by the heating conduit system, the ambient environment and insulating boundary conditions, etc., and can range from a few days to a few months. It has been observed that the hydrocarbons can begin to remove when hydrocarbonaceous material 32 reaches a temperature of about 600 degrees Fahrenheit.

As the higher temperatures spread towards the edges of the containment capsule 20, the top surface of the permeable body 30 can continue to subside through the $t_2$ and $t_3$ positions, following a pattern in which the center region can still experience more vertical movement than the edges. However, continuous heating can eventually raise the temperature throughout the entire permeable body 30 to the critical extraction point, causing even the material adjacent the boundaries of the impoundment 10 to release its hydrocarbons. At that point the outer regions can also undergo significant vertical subsidence until the top surface reaches the $t_4$ position.

The amount of vertical subsidence experienced by the permeable body 30 can vary greatly, depending upon composition of the hydrocarbonaceous material 32 and its initial configuration. Although exaggerated in FIG. 2 for illustrative purposes, the amount of vertical movement of the top surface can range between 5% and 25% of the initial vertical height of the body, with a subsidence of 12%-16% being common. Small relative displacements between adjacent conduit segments that are both embedding with the subsiding body can be accommodated by providing the heating conduit with flexible joints, seams or corrugations 76 which can absorb localized bending. (see FIG. 3). However, maintaining the structural integrity and heat transfer fluid connection of the conduit joints that connect the displaceable heating conduit with the stationary heat source located outside the constructed permeability control structure, can be challenging.

Figure 3:
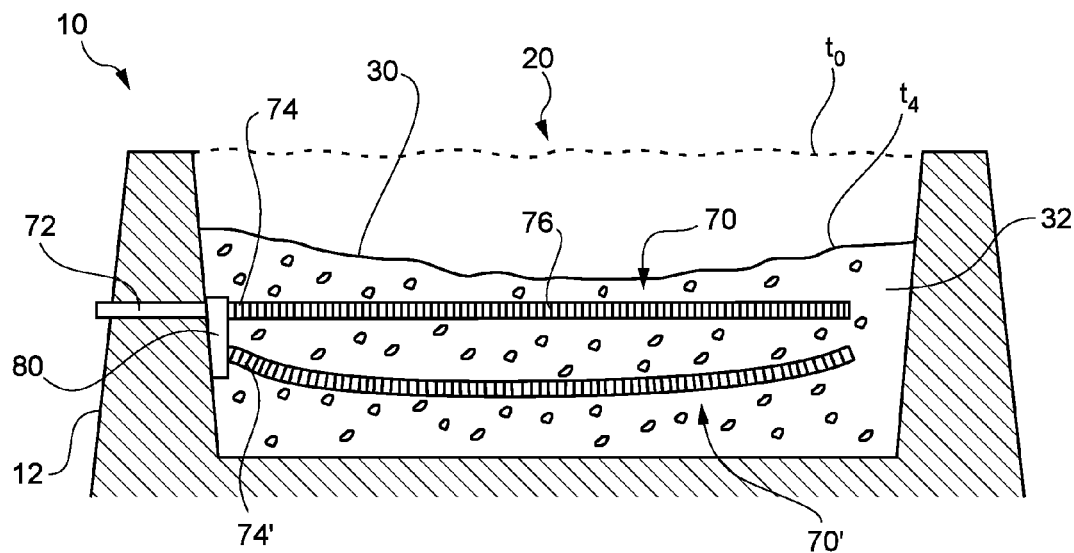
FIG. 3 illustrates a side sectional view of the subsiding permeable body of FIG. 2 having a displaceable heating conduit buried therein, in accordance with one embodiment.

One system for maintaining the fluid connection between the source outlet 72 and the conduit inlet 74 is an articulated conduit linkage system, illustrated in one specific embodiment at 80 in FIG. 3. The source outlet 72 can be a stationary conduit or pipe that extends from a fluid source (not shown) located outside the constructed permeability control infrastructure 10, through the side walls 12 of the impoundment, and into the containment capsule 20 where it is coupled to the conduit linkage system 80. The fluid source can supply a working fluid to the displaceable conduit 70 embedded or buried with the permeable body 30 of hydrocarbonaceous material 32. If the permeable body 30 subsides from position $t_0$ to $t_4$, the inlet 74' of the displaced conduit 70' can displace to a location that is substantially lower than its original position. As described above, the conduit linkage system 80 can continue to operate both during the subsidence and after its completion to maintain the fluid connection between the stationary and displaceable segments of conduit.

In one embodiment, the working fluid can be a heat transfer fluid, the fluid source can be a heat source for supplying the heat transfer fluid, and the displaceable conduit 70 can be a heating conduit for receiving the heat transfer fluid and conveying it throughout the containment capsule 20 for the purpose of heating the permeable body. However, the conduit linkage system 80 is not limited to the heating system of the constructed permeability control infrastructure 10, and can also be used to couple fluid sources (or collection systems) and displaceable conduits that operate a working fluid other than the heat transfer fluid.

For example, the gas gathering or injection pipes (identified as 66 in FIG. 1) can be configured with the conduit linkage system 80, as the gathering or injection pipes may also be embedded in the subsiding permeable body 30. Other applications include liquids gathering or injection pipes (not shown). For injection systems the direction of flow of the working fluid can be as described above, with the working fluid flowing from the fluid source outside the impoundment 10, through the conduit linkage system 80 and into the displaceable conduit 70 buried at a depth within the subsiding permeable body. For collection systems, however, the direction of flow of the working fluid can be reversed, and the outlet 74 of the displaceable conduit 70 buried at a depth within the subsiding permeable body can supply the working fluid, through the conduit linkage system 80, to a collection system inlet 72 that extends outside the control infrastructure.

Figure 4A:
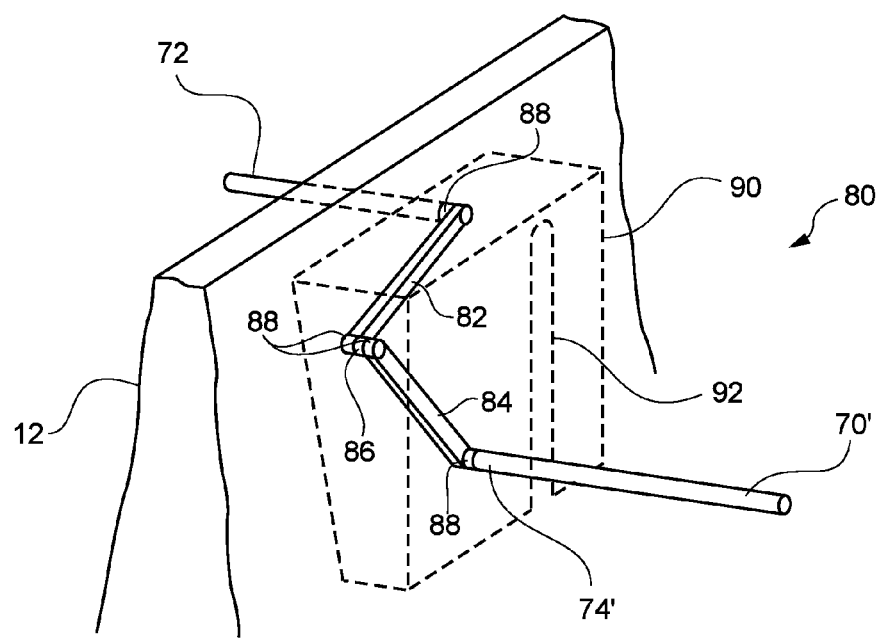
FIGS. 4a-4c together illustrate a perspective side, plan and front elevation views of an articulating conduit linkage system and box enclosure, in accordance with an exemplary embodiment.
Figure 4B:
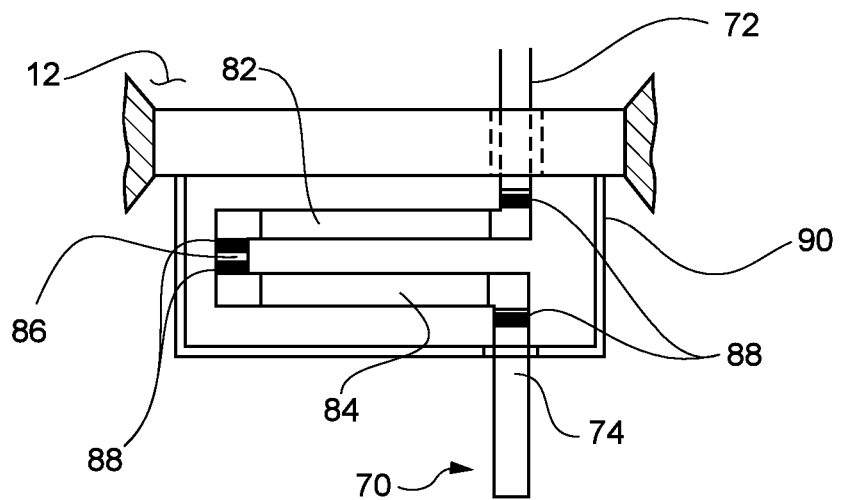
Figure 4C:
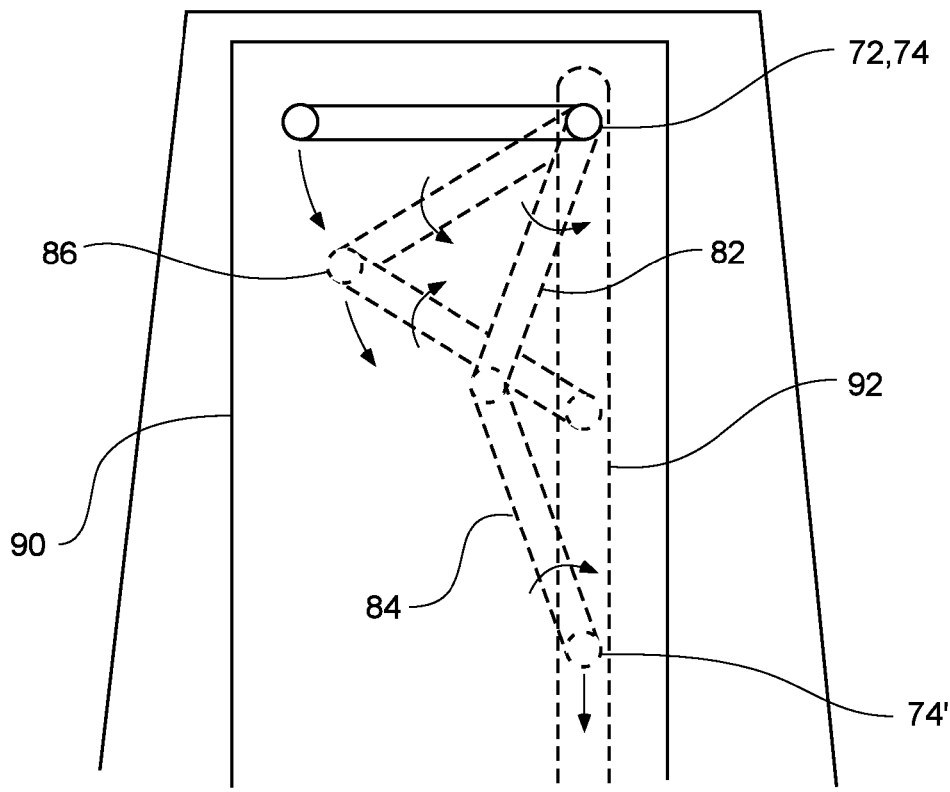

An exemplary embodiment of the conduit linkage system 80 is shown in FIGS. 4a-4c, and can include a plurality of articulating conduit segments 82, 84, 86 coupled together with conduit joints 88. For instance, the linkage system can include an outer conduit segment 82 that can be coupled to the source outlet 72 with a first single-axis swivel joint, and an inner conduit segment 84 can be coupled to the conduit inlet 74, 74' with a second swivel joint. The linkage system can also include at least one middle or intermediate conduit segment 86 that operably connects the outer and inner segments, respectively, with at least one single-axis swivel joint, to establish a working fluid connection between the fluid source (not shown) and the displaceable conduit 70, 70'.

The plurality of articulating conduit segments 82, 84, 86 and the conduit joints 88 can be surrounded by a protective, motion-free box enclosure 90 that can prevent the encroachment of hydrocarbonaceous material into the articulating linkage's operating space. The stationary source outlet 72 can enter the box enclosure 90 through a single circular opening in the outer face of the enclosure, which can be adjacent the side wall 12 of the impoundment 10. In contrast, the moveable conduit inlet 74, 74' can enter the box enclosure through an elongated slot 92 or window that can extend the vertical length of inner wall of the box enclosure to allow for the unrestricted movement of the conduit inlet as it displaces downward. As discussed in more detail below, a sliding vane panel device or similar structure can be mounted into the elongated slot 92 to cover and protect the exposed portions of the opening and allow for the displaceable conduit 70' to travel downwards.

In their initial, non-extended position, the articulating conduit segments 82, 84, 86 can be arranged in a substantially horizontal position, and with the longitudinal axes of the source outlet 72 and the conduit inlet 74 substantially aligned with one another. (see FIG. 4*c*). It can be appreciated by one of skill in the art that a subsequent subsidence of the permeable body can cause a relative displacement between the source outlet 72 and the conduit inlet 74' that is perpendicular (in this case downward) to the longitudinal axes. To accommodate this motion, the plurality of articulating conduit segments can be configured in a toggle orientation, so that any subsidence within the permeable body that causes the inlet 74' of the displaceable conduit to move downwards, can in turn cause the outer 82 and inner 84 conduit segments to rotate in opposite directions to extend the conduit linkage system 80, thus maintaining the structural integrity and working fluid connection between the stationary and displaceable segments of conduit. (see FIG. 4*b*).

Although the conduit linkage system 80 can operate if any three of the four conduit joints 88 connecting the three conduit segments 82, 84, 86 with the source outlet 72 and conduit inlet 74, 74' allow for rotation movement, it is assumed that the source outlet and conduit inlet are rotationally fixed within their respective support structures (e.g. the side wall 12 of the impoundment 10 and the subsiding permeable body 30). Therefore, the conduit joints 88 connecting the outer and inner rotating conduits 82, 84 with the non-rotating outlet 72 and inlet 74, 74' can be single-axis swivel joints. One or both of the conduit joints 88 connecting the intermediate conduit 86 with the outer 82 and inner 84 rotating conduits, consequently, can also be single-axis swivel joints.

As the amount of hydro carbonaceous material contained within the constructed permeability control infrastructure can be quite large, the volume of working fluid, as well as the diameter of the associated piping or conduit system, needed to affect the mass properties of the permeable body can also be quite large. For instance, the heat source outlet and heating conduit inlet can be from several inches up to 36 inches or more in diameter to allow a sufficient volume of heat transfer fluid to enter and heat the permeable body. Additionally, the associated piping or conduit system can experience extreme operating conditions, such as heavy side loading created by the weight of overlying material and operating temperatures as high as 900 degree to 1000 degrees Fahrenheit. Providing a swivel or rotating conduit joint of large enough size and which can operated in the severe operating conditions may be difficult. One type of swivel joint that can be particularly suitable for such large diameter piping and extreme operating conditions is the threaded pipe joint. Threaded pipe joints can effectively seal the conduit joints against fluid leakage while still allowing the pipe to rotate through a limited range of motion, e.g. up to 90°.

Other types of high-temperature swivel joints, however, can also be suitable. For example, as shown schematically in FIG. 5*a*, a stationary conduit segment 102 that is anchored or fixed with anchor system 106 can be operably coupled and sealed to rotating a conduit segment 104 with a high-temperature carbon-to-carbon face seal 110. The carbon-to-carbon face seal can include two annular carbon discs 114 that are mounted to adjacent inside faces of conduit flanges 112, which can then be held together with an outer retaining ring or device 116. The extreme hardness and heat resistance of the carbon discs can provide a high-temperature friction contact interface that does not easily wear or degrade with rotation of conduit segment 104, and can thus maintain a reliable mechanical seal for the life of the conduit swivel joint.

Figure 5A:
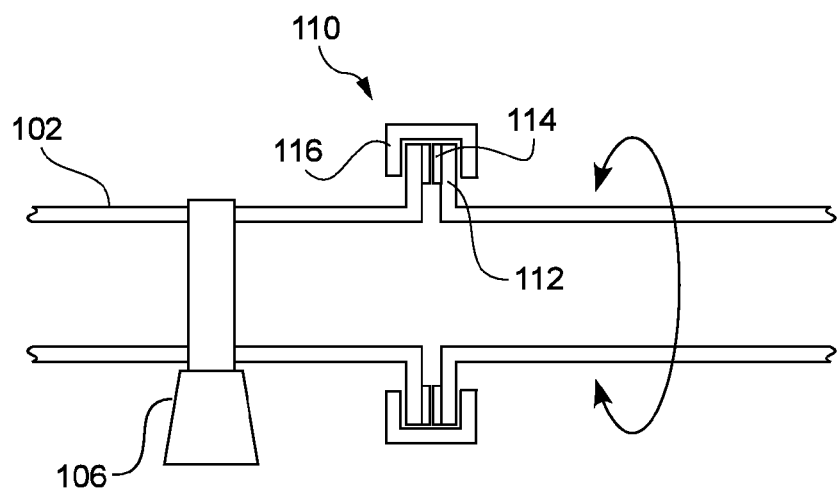
FIG. 5a through 5c illustrate side sectional views of several swivel joints for use in the linkage system, in accordance with one embodiment.
Figure 5B:
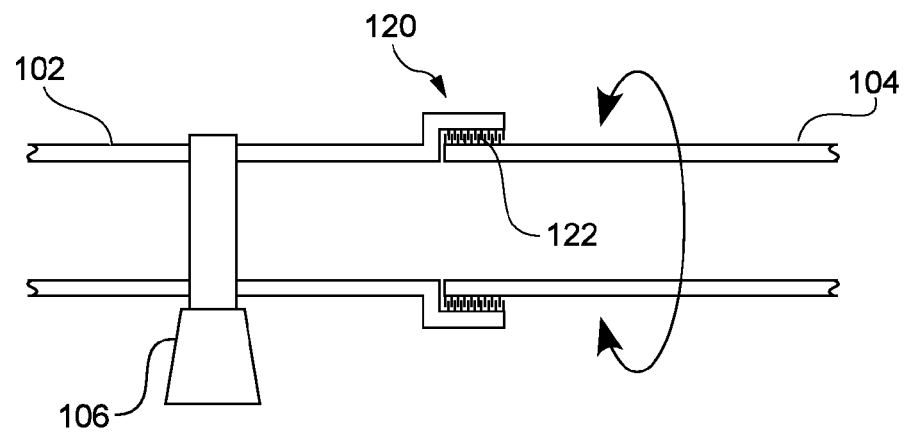
Figure 5C:
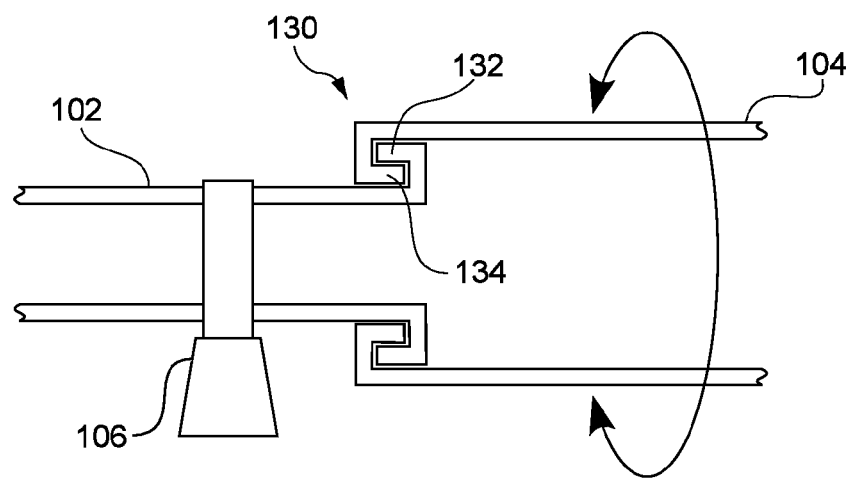

Alternative types of high-temperature seals can include labyrinth mechanical seals 120 having metal rings 122 alternately extending from the inner rotating surface and the outer stator surface, and which act as "teeth" to form a tortuous sealing passage for gases and liquids (FIG. 5*b*). Another suitable joint can include slip joints 130 having interlocking annular protrusions or rings 132, 134 extending axially from the flanges of the stationary 102 and rotating 104 conduit segments, respectively, and which can interconnect to form another type of passage which seals against the flow of high-temperature fluids (FIG. 5*c*). Moreover, other types of mechanical seals and/or swivel joint connections, etc., for facilitating the relative rotation of one conduit segment relative to another conduit segment while preventing the escape of high-temperature gases or liquids through the stationary/rotating interface can be used.

The embodiment illustrated in FIGS. 4*a*-4*c* can comprise of two rotating conduit segments 82, 84 that each rotate about an axis perpendicular to the longitudinal axis of that conduit segment (which in this case is coincident with the longitudinal axis of the source outlet 72 or conduit inlet 74, 74'), as well as one intermediate conduit segment 86 that both translates and spins about its own longitudinal axis. It is to be appreciated, moreover, that additional intermediate conduit segments (in pairs of one rotating and one spinning conduit segments) can be added to increase the range of motion of the conduit linkage system 80.

Figure 6:
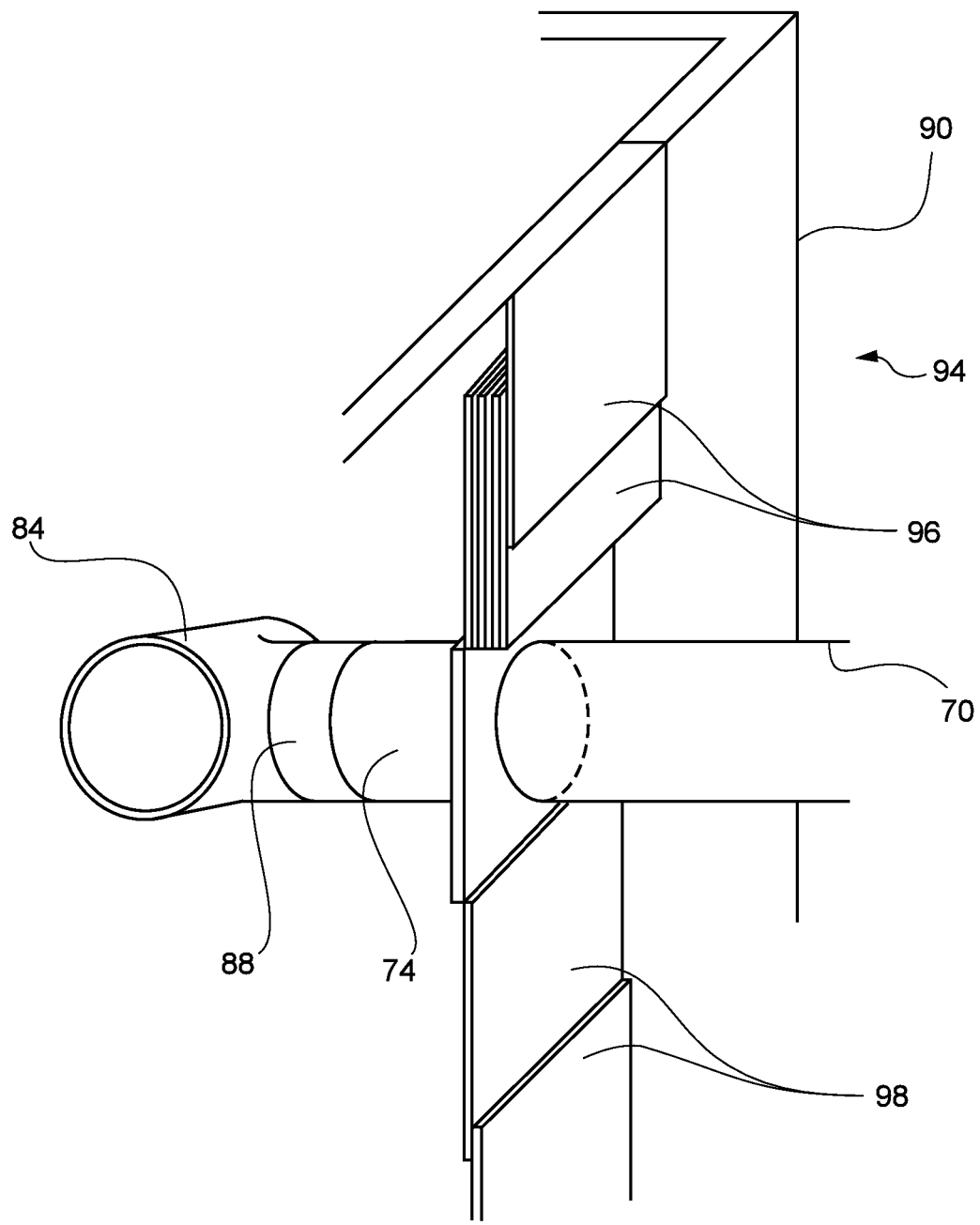
FIG. 6 illustrates a perspective side view a sliding vane panel device mounted to the box enclosure, in accordance with an exemplary embodiment.

Shown in FIG. 6 is the second swivel joint 88 that connects the conduit inlet 74 with the inner conduit segment 84, along with one example of the sliding vane panel device 94 that can seal the elongated slot opening of the box enclosure 90 to prevent the encroachment of hydrocarbonaceous material into the articulating linkage's operating space. The sliding vane panel device 94 can include a series of upper sliding vane panels 96 that are each coupled to adjacent vane panels at an upper or lower edge, but which can slide relative to each other so that all of the vane panels can be grouped together when the articulated conduit linkage system is set into its initial position. Downward movement of the conduit inlet 74 brought on by the subsidence of the permeable body can allow the upper group of sliding vane panels 96 to drop downwards, sequentially leaving panels behind to cover the exposed opening. The panel device 94 can also include a series of lower sliding vane panels 98 which operate in much the same way, with the exception that the lower vane panels are extended in the initial position and become sequentially grouped together as the conduit inlet 74 descends. Other similar sliding panels can be used to prevent solid debris from entering the box enclosure.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. An articulated conduit linkage system for maintaining a fluid connection between a fluid source and displaceable conduit buried within a subsiding permeable body, comprising:
    a fluid source for supplying a working fluid through a source outlet and being located outside the permeable body;
    a displaceable conduit for receiving the working fluid through a conduit inlet and being buried at a depth within the subsiding permeable body;
    a plurality of articulating conduit segments comprising:
        an outer conduit segment operably coupled to the source outlet with a first single-axis swivel joint;
        an inner conduit segment operably coupled to the conduit inlet with a second single-axis swivel joint; and
        at least one middle conduit segment operably connecting the outer and inner segments, respectively, with at least one single-axis swivel joint, to establish a working fluid connection between the fluid source and the displaceable conduit; and
    a box enclosure surrounding the plurality of articulating conduit segments and having a sliding vane panel adjacent the conduit inlet for preventing encroachment of the permeable body into the box enclosure,
    wherein a subsidence of the permeable body causes a relative displacement between the source outlet and the conduit inlet that is perpendicular to the longitudinal axes of both the outlet and the inlet, causing the outer and inner conduit segments to rotate in opposite directions to extend the conduit linkage system while maintaining the working fluid connection between the source outlet and the conduit inlet.

2. The conduit linkage system of claim 1, wherein the single-axis swivel joints further comprises threaded pipe joints.

3. The conduit linkage system of claim 1, wherein the working fluid is a heat transfer fluid, the fluid source is a heat source for supplying the heat transfer fluid, and the displaceable conduit is a heating conduit for receiving the heat transfer fluid.

4. The conduit linkage system of claim 3, wherein the heat transfer fluid is selected from the group consisting of a heated exhaust gas, heated air, steam, hydrocarbon vapors, and a heated liquid.

5. The conduit linkage system of claim 3, wherein the heat transfer fluid is heated to a temperature between 200 degrees and 1000 degrees Fahrenheit.

6. The conduit linkage system of claim 1, wherein the direction of flow of the working fluid is reversed, and a displaceable conduit outlet buried at a depth within the subsiding permeable body supplies the working fluid through the plurality of articulating conduit segments to a collection system inlet located outside the constructed permeability control infrastructure.

7. The conduit linkage system of claim 6, wherein the permeable body is a hydro carbonaceous material and the working fluid is a produced hydrocarbon gas recovered from the permeable body of hydro carbonaceous material.

8. The conduit linkage system of claim 6, wherein the permeable body is a hydro carbonaceous material and the working fluid is produced hydrocarbon liquid recovered from the permeable body of hydro carbonaceous material.

9. The conduit linkage system of claim 1, wherein the sliding vane panel further comprises:
    a series of upper vane sliding panels that are each coupled to an adjacent vane panel at an upper or lower edge, but which can slide relative to one another so that all of the upper vane sliding panels can be grouped together when the articulated conduit linkage system is set into an initial position; and
    a series of lower sliding vane panels that are each coupled to an adjacent vane panel at an upper or lower edge, but which can slide relative to one another so that all of the upper vane sliding panels can be grouped together when the articulated conduit linkage system is set into an initial position.

10. The conduit linkage system of claim 1, wherein the subsiding permeable body is selected from the group consisting of oil shale, tar sands, coal, lignite, bitumen, and peat.

11. A method of operably coupling a fluid source and displaceable conduit buried with a subsiding permeable body contained within a constructed permeability control infrastructure, comprising:
    providing a fluid source for supplying a working fluid through a source outlet and being located outside the constructed permeability control infrastructure;
    providing a displaceable conduit for receiving the working fluid through a conduit inlet and being buried at a depth within the subsiding permeable body contained within the control infrastructure;
    establishing a fluid connection between the heat source and the heating conduit with a plurality of articulating conduit segments comprising:
        an outer conduit segment operably coupled to the source outlet with a first single-axis swivel joint;
        an inner conduit segment operably coupled to the conduit inlet with a second single-axis swivel joint; and
        at least one middle conduit segment operably connecting the outer and inner segments, respectively, with at least one single-axis swivel joint, to establish a working fluid connection between the fluid source and the displaceable conduit; and
    providing a box enclosure surrounding the plurality of articulating conduit segments and having a sliding vane panel adjacent the conduit inlet for preventing encroachment by the permeable body into the box enclosure, wherein a subsidence of the permeable body causes a relative displacement between the source outlet and the conduit inlet that is perpendicular to the longitudinal axes of both the outlet and the inlet, causing the outer and inner conduit segments to rotate in opposite directions to extend the conduit linkage system while maintaining the working fluid connection between the source outlet and the conduit inlet.

12. The method of claim 11, wherein the single-axis swivel joints further comprises threaded pipe joints.

13. The method of claim 11, wherein the working fluid is a heat transfer fluid, the fluid source is a heat source for supplying the heat transfer fluid, and the displaceable conduit is a heating conduit for receiving the heat transfer fluid.

14. The method of claim 13, wherein the heat transfer fluid is selected from the group consisting of a heated exhaust gas, heated air, steam, hydrocarbon vapors, and a heated liquid.

15. The method of claim 13, wherein the heat transfer fluid is heated to a temperature between 200 degrees and 1000 degrees Fahrenheit.

16. The method of claim 11, wherein the direction of flow of the working fluid is reversed, and a displaceable conduit outlet buried at a depth within the subsiding permeable body supplies the working fluid through the plurality of articulating conduit segments to a collection system inlet located outside the constructed permeability control infrastructure.

17. The method of claim 16, wherein the permeable body includes a hydro carbonaceous material and the working fluid is a produced hydrocarbon gas recovered from the permeable body of hydro carbonaceous material.

18. The method of claim 16, wherein the permeable body includes a hydro carbonaceous material and the working fluid is produced hydrocarbon liquid recovered from the permeable body of hydro carbonaceous material.

19. The method of claim 11, wherein the sliding vane panel further comprises:
  a series of upper vane sliding panels that are each coupled to an adjacent vane panel at an upper or lower edge, but which can slide relative to one another so that all of the upper vane sliding panels can be grouped together when the articulated conduit linkage system is set into an initial position; and
  a series of lower sliding vane panels that are each coupled to an adjacent vane panel at an upper or lower edge, but which can slide relative to one another so that all of the upper vane sliding panels can be grouped together when the articulated conduit linkage system is set into an initial position.

20. The method of claim 11, wherein the subsiding permeable body is selected from the group consisting of oil shale, tar sands, coal, lignite, bitumen, and peat.

* * * * *